Aug. 15, 1961     C. J. CISLO     2,996,308
SELF-ALIGNING SUSPENSION CONTROL ARM BEARING ASSEMBLY
Filed Nov. 10, 1958
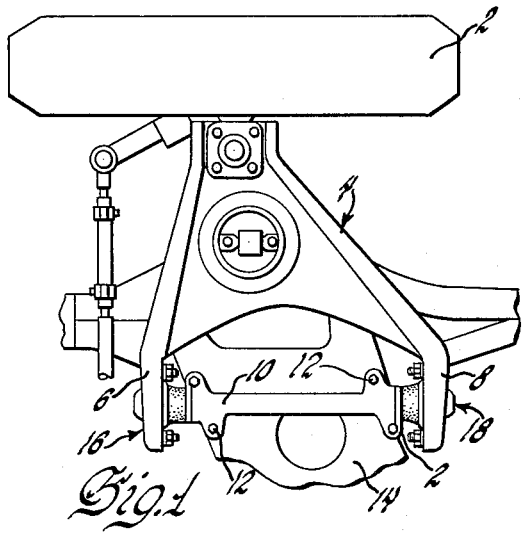
INVENTOR.
Casimer J. Cislo
BY
W. F. Wagner
ATTORNEY

United States Patent Office 2,996,308
Patented Aug. 15, 1961

2,996,308
SELF-ALIGNING SUSPENSION CONTROL ARM BEARING ASSEMBLY
Casimer J. Cislo, Detroit, Mich., assignor to General Motors Corporation, Detroit, Mich., a corporation of Delaware
Filed Nov. 10, 1958, Ser. No. 772,830
5 Claims. (Cl. 280—96.1)

This invention relates to vehicle suspension and more particularly to control arm and pivot shaft assemblies therefor.

In the majority of production passenger vehicles, dirigible wheels are connected to the vehicle sprung mass by means of one or more wishbone like control arms having spaced apart inboard ends which are journalled on a pivot shaft rigidly attached to the vehicle frame. Conventionally, some form of anti-friction bearing is disposed between each end of the pivot shaft and the adjacent leg of the control arm. In the past, it has been the practice to employ cylindrical bearings such as threaded bushings or smooth cylindrical bearings disposed in rubber bushings.

In normal operation of a vehicle, the inboard ends of the control arms are subjected to considerable torsional stress tending to cause misalignment and consequent binding which inhibits free oscillatory movement of the control arm relative to the pivot shaft. In addition, a certain degree of misalignment between the opposite ends of the pivot shaft may occur in the course of the fabricating and heat treating processes involved in the manufacture thereof.

An object of the present invention is to provide an improved control arm and pivot shaft assembly which substantially eliminates binding due to static or transient misalignment of the bearings at opposite ends of the pivot shaft.

A further object is to provide a suspension control arm and pivot shaft assembly including spherical bearing members which are disposed on and axially adjustable relative to the opposite ends of the pivot shaft, the bearings being rotatable relative to the shaft responsive to vertical deflection of the control arm.

Still another object is to provide an assembly of the stated character wherein the bearing member comprises an element having internal threads engaging corresponding external threads on the pivot shaft and a semi-spherical outer surface disposed in bearing engagement with cooperating socket portions formed on the control arm, the socket portions being so constructed and arranged as to permit limited angular movement of the bearing member relative thereto while assuring rotation of the bearing member with respect to the threaded pivot shaft upon deflection of the control arm in a plane normal to the axis of the shaft.

A still further object is to provide a construction of the stated character which permits of simple and rapid initial assembly and adjustment to eliminate end play between the shaft and arm and further provides means for assuring retention of the initial adjustment.

In general, the invention involves providing partially spherical ball portions which are preferably formed of moldable high impact self-lubricating plastic material. These members are arranged with respect to the pivot shaft and the socket portions are formed on the control arm in such a way that any misalignment is accommodated by angular movement of the ball member relative to the socket while oscillatory movement of the arm is accommodated solely by relative rotation between the bearing member and the pivot shaft.

These and other objects, advantages and features of the invention will become more fully apparent as reference is had to the accompanying specification and drawings wherein:

FIG. 1 is a bottom plan view of a suspension structure according to the invention, in association with one dirigible wheel of a vehicle;

FIG. 2 is an enlarged fragmentary view, partly in section, illustrating the details of construction of the bearing assembly utilized in FIG. 1;

FIG. 3 is a view similar to FIG. 2 illustrating a modified form of the invention; and FIG. 4 is an enlarged perspective view illustrating the configuration of the preferred form of bearing element illustrated in FIG. 2.

Referring now to the drawings and particularly FIG. 1, there is shown a portion of a vehicle suspension in which a wheel 2 is dirigibly connected to the outer end of a transversely extending wheel wishbone type control arm 4. At its inner end, control arm 4 has a pair of longitudinally spaced apart legs 6 and 8 which are rotatably secured at the forward and rearward ends, respectively, of a pivot shaft 10. Shaft 10, in turn, is rigidly secured as by bolts 12 to the usual vehicle cross frame member 14. In order to provide for relatively friction free oscillatory movement of arm 4 with respect to shaft 10, connection between legs 6 and 8 and the opposite ends of shaft 10 is accomplished by means of identical bearing assemblies 16 and 18.

Inasmuch as bearings 16 and 18 are identical in construction, it will be understood that while the specific disclosure of FIG. 2 and the following description is directed to the construction of assembly 18, it applies with equal force to assembly 16.

As seen best in FIG. 2, pivot shaft 10 is provided with a threaded end portion 20 which extends through an aperture 22 formed in the vertical wall portion 24 of leg 8. Peripherally adjacent aperture 22, wall portion 24 is dished inwardly to form a semi-spherical socket portion 26 which forms the inner bearing surface for the outer semi-spherical surface 28 of a molded plastic bearing element 30 in the form of a truncated ball. Element 30 is provided with a cylindrical threaded inner bore 32 which cooperates with the threaded portion 20 of shaft 10 so that bearing element 30 is freely rotatable into an axial position on shaft 10, causing the semi-spherical surface 28 to lightly engage socket portion 26. In practice, the described assembly operation is carried out either simultaneously or consecutively at both ends of shaft 10 and upon completion results in elimination of end play between shaft 10 and arm 4. In addition, due to the fact that end play may be removed in this manner regardless of the particular longitudinal portion of arm 4 relative to shaft 10, initial caster adjustment of the suspension assembly may be accomplished simultaneously. Following establishment of the desired caster adjustment and elimination of end play, a flanged cap structure 34 is secured over the outer surface of wall 24 by a plurality of bolts 36. Cap structure 34 includes an outwardly dished semi-spherical socket portion 38 which cooperates with socket portion 26 to form the total bearing surface for the semi-spherical outer surface 28 of bearing element 30.

In accordance with one feature of the invention, socket portion 38 includes a dimple or indentation 40 which extends inwardly into one of several semi-spherical recesses or depressions 42 (FIG. 4) formed at circumferentially spaced intervals on outer surface 28 of bearing 30 adjacent the outer end of the latter. The cooperating engagement of dimple 40 and depression 42 functions to prevent relative rotation between bearing member 30 and leg 8 with respect to the axis of shaft 10 and thus assures retention of the initial adjustment for caster and end play previously described. However, according to another feature of the invention, the radius of curvature of depression 42 is selected so that bearing element 30 may rock to a limited extent relative to arm 8 in planes parallel to the axis of shaft 10 and thus compensate for any static misalignment between the opposite ends of the shaft 10, or torsionally induced misalignment between legs 6 and 8 of arm 4. It will be understood that both the number and precise configuration of depression 42 is subject to variation and is not necessarily limited to the form shown in FIG. 4. In practice, the number of depressions provided will be determined by the thread pitch of portions 20 and 32 so that minimum back off from the optimum end play adjustment position of bearing member 30 will place one of the several depressions in registration with the cooperating dimple on cap structure 34.

In FIG. 3, there is shown a modification of the invention wherein the cooperating dimples and indentations respectively of bearing member 30 and socket portion 34 are eliminated. In the modified form, the bearing element 44 is threadably disposed on end 20 of pivot shaft 10 in the same manner as described with respect to the preferred embodiment. Element 44 effects bearing engagement with the inner semi-spherical socket portion 46 of arm 8. However, the cap structure 48 is provided with a flange 50 which is spaced axially with respect to the semi-spherical portion 52 thereof so that the latter exerts a substantial pressure on the semi-spherical outer surface of the bearing element when flange 50 is drawn into engagement with wall 24 of arm 8 by bolt 54. In this form of the invention, it is only necessary that the frictional loading between the outer surface of bearing 44 and socket portions 46 and 52 be greater than the frictional resistance between the internal threads 56 of the bearing member and the external threads 20 of the pivot shaft. It will be apparent that under these circumstances bearing 44 will rotate relative to the pivot shaft during vertical deflection of the arm 4 owing to the lower frictional resistance; yet relative rocking movement of the bearing and arm 8 will be permitted to occur as soon as the force tending to induce rocking movement exceeds the frictional resistance between bearing 44 and the socket portions 46 and 52.

From the foregoing it will be seen that a substantially simplified and improved suspension control arm bearing assembly has been provided. The construction not only overcomes inherent disadvantages present in constructions heretofore known, but in addition is susceptible to assembly and adjustment procedure of extreme simplicity. Furthermore, subsequent service adjustments, such as may be required to compensate for wear, may be readily performed with a minimum of skill and equipment. A still further advantage lies in the fact that in cases where service replacement is required, the bearing assembly may be restored to original condition by merely replacing the single plastic element and reassembling the structure in the manner described.

While the composition of the bearing element is not limited to any particular material, it is preferable that it be formed of moldable high impact plastics such as phenolic resins, polyamides, and polycarbamates.

While two embodiments of the invention have been shown and described, it will be apparent that other changes and modifications may be made therein. It is, therefore, to be understood that it is not intended to limit the invention to the embodiments shown, but only by the scope of the claims which follow.

What is claimed is:

1. A joint assembly for wheel suspension structure comprising a pivot shaft having threaded opposite ends, a support member having apertured spaced legs surrounding said threaded end portions, each of said legs having semi-spherical socket portions concentric with said shaft, a semi-spherical bearing member threadably disposed on each of said pivot shaft threaded ends in axially spaced relation such that the engagement thereof with the adjacent socket portion eliminates end play between the shaft and support member, a cap structure detachably secured on each leg in alignment with the shaft, each cap structure having a semi-spherical socket portion engaging said semi-spherical bearing member, and interengaging means on the bearing member and socket portion of said cap structure effective to prevent relative rotation therebetween about the axis of said shaft but allowing rocking movement between the bearing member and cap structure.

2. The structure set forth in claim 1 wherein said bearing member is compressed between the semi-spherical portions sufficiently that the frictional resistance therebetween is greater than the frictional resistance to rotation between the cooperating threads of said bearing and said shaft but insufficient to offer substantial resistance to rocking movement of said bearing member relative to said support member.

3. A joint assembly for wheel suspension structure comprising a pivot shaft having threaded opposite ends, a support member having spaced legs surrounding said threaded end portions, each of said legs having semi-spherical outwardly facing socket portions formed therein, an internally threaded semi-spherical bearing member threadably disposed on each of said pivot shaft threaded ends and engaging the adjacent socket portion so as to eliminate end play, a cap member detachably secured on each leg, each cap member having a semi-spherical socket portion engaging said semi-spherical bearing member, and interengaging means on the bearing member and said cap member preventing relative rotation therebetween about the axis of said shaft but allowing limited rocking movement of said bearing member relative to said cap, said interengaging means comprising a projection on one of said members and a plurality of indentations formed on the other of said members spaced circumferentially thereon so registration between the projection and an indentation may be obtained by threading the ball on the shaft in increments of less than one turn.

4. A joint assembly for wheel suspension structure comprising a pivot shaft having threaded opposite ends, a support member having spaced legs surrounding said threaded end portions, each of said legs having semi-spherical outwardly facing socket portions formed therein, an internally threaded semi-spherical bearing member threadably disposed on each of said pivot shaft threaded ends and engaging the adjacent socket portion so as to eliminate end play, a cap member detachably secured on each leg, each cap member having a semi-spherical socket portion engaging said semi-spherical bearing member, and interengaging means on the bearing member and said cap member preventing relative rotation therebetween about the axis of said shaft but allowing limited rocking movement of said bearing member relative to said cap, said interengaging means comprising a projection on the cap member and a series of circumferentially spaced indentations formed on the bearing member which cooperate sequentially with the projection upon indexing of the bearing member about the pivot shaft.

5. A joint assembly for wheel suspension structure comprising a pivot shaft having threaded opposite ends, a support member having spaced legs surrounding said threaded end portions, each of said legs having semi-spherical socket portions formed therein, an internally threaded bearing member threadably disposed on each of said pivot shaft threaded ends and having a semi-spherical outer surface engaging the adjacent socket portion so as to eliminate end play, a cap structure detachably secured on each leg, each cap structure having a semi-spherical socket portion engaging said semi-spherical bearing member and exerting force thereon providing frictional resistance greater than the frictional resistance between the internal threads of said bearing and those of said shaft.

References Cited in the file of this patent

UNITED STATES PATENTS

| | | | |
|---|---|---|---|
| 847,719 | Arnold | Mar. 19, | 1907 |
| 1,438,214 | Brady et al. | Dec. 12, | 1922 |
| 2,088,798 | Leighton | Aug. 3, | 1937 |
| 2,172,029 | McVoy | Sept. 5, | 1939 |
| 2,576,885 | Leighton | Nov. 27, | 1951 |
| 2,779,603 | McRae | Jan. 29, | 1957 |
| 2,814,538 | Connolly | Nov. 26, | 1957 |
| 2,862,741 | Baker | Dec. 2, | 1958 |